United States Patent Office.

HENRI ALBERT ALEXANDRE LUSSIGNY, OF PARIS, FRANCE.

PROCESS OF CARROTTING FURS.

SPECIFICATION forming part of Letters Patent No. 501,797, dated July 18, 1893.

Application filed November 29, 1892. Serial No. 453,535. (No specimens.) Patented in France October 17, 1892, No. 224,980; in Belgium October 21, 1892, No. 101,805, and in Italy November 12, 1892, No. 32,908.

*To all whom it may concern:*

Be it known that I, HENRI ALBERT ALEXANDRE LUSSIGNY, a citizen of the Republic of France, residing in Paris, France, have invented certain new and useful Improvements in the Process of Carrotting Furs Intended for the Manufacture of Felts Without Using Mercury, (for which patents have been obtained in France, No. 224,980, dated October 17, 1892; in Belgium, No. 101,805, dated October 21, 1892, and in Italy, No. 32,908, dated November 12, 1892,) of which the following is a specification.

My invention relates to carrotting or preparing furs, intended for the manufacture of felts, without using mercury.

In carrotting or preparing furs intended for the manufacture of felts as ordinarily conducted, nitrate of mercury is applied to the furs being operated upon and according as the strength of the liquor containing the nitrate of mercury is in a less or greater degree of concentration the carrotting produced is pale or yellow. The use of nitrate of mercury is very objectionable in consequence of the fatal effects on the health of the workmen who have to work upon the fur.

My invention consists in the application in the process of carrotting or preparing furs for use in the manufacture of felts, of materials by means of which nitrate of mercury in such process is replaced completely and with advantage. I employ the alkalies, caustic potash and caustic soda, which possess carrotting properties in a very high degree and give much more satisfactory results than nitrate of mercury without having its objectionable qualities. I employ caustic potash or caustic soda either separately or together or in combination or mixture with any other materials and I cause the liquors of caustic potash or caustic soda which I employ to be of any degree of concentration which may be necessary or desirable according to the degree or violence of fulling or felting properly required by the hatter by whom the fur operated upon is to be used.

In one manner of attaining the object of my invention I employ preferably a solution of caustic potash which is made as concentrated as possible and diluted when it is to be employed, with water so that it shall be of a density corresponding to from 4° to 7° of Baumé's hydrometer or a specific gravity of from 1.03 to 1.05, the specific gravity of water being taken as unity.

The operations involved in carrotting or preparing furs for use in the manufacture of felts by means of the materials provided according to my invention are similar to those performed when nitrate of mercury is employed in carrotting furs. The felt to be operated upon is placed on the carrotter's bench and the operator applies the carrotting liquid by means of a brush so that the liquid may be caused to penetrate as far as the skin or to the extent which may be necessary or desirable, and the subsequent drying of the felt is effected in a stove and at a temperature similar to that employed in carrotting by means of nitrate of mercury. The other operations to which the fur is subjected remain the same as in the process hitherto employed.

I claim as my invention—

1. The hereinbefore described improvement in the process of carrotting or preparing furs for use in the manufacture of felts which consists in treating the furs with caustic alkali.

2. The hereinbefore described improvement in the process of carrotting or preparing furs for use in the manufacture of felts which consists in treating the furs with caustic potash.

In testimony whereof I have signed my name to this specification in the presence of two subscribing witnesses.

HENRI ALBERT ALEXANDRE LUSSIGNY.

Witnesses:
 CHARLES DONY,
 ROBT. M. HOOPER.